Figures 1, 2:
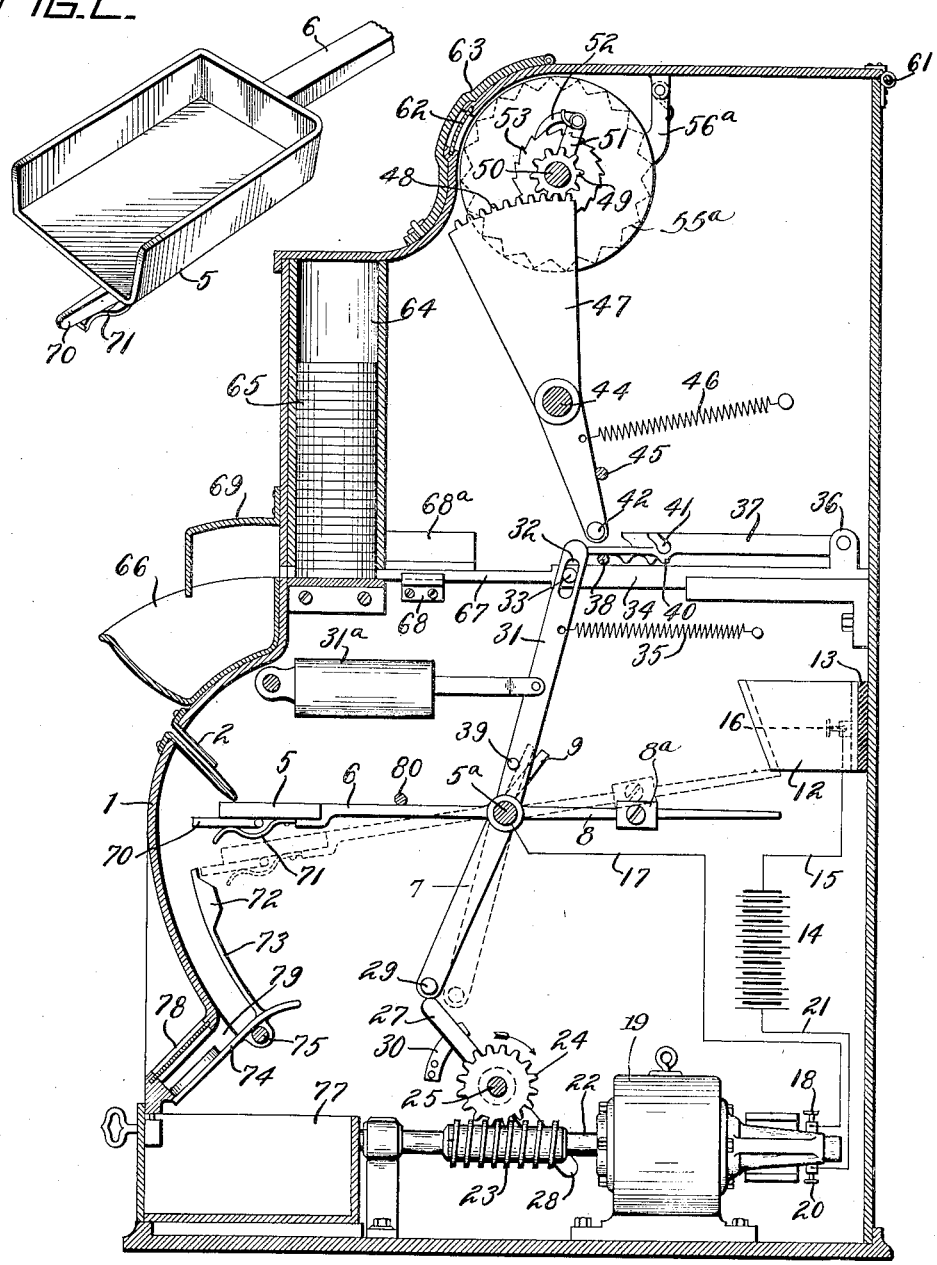

W. H. MUZZY.
CASH REGISTER.
APPLICATION FILED OCT. 29, 1914.

1,153,330.

Patented Sept. 14, 1915.
2 SHEETS—SHEET 1.

Witnesses
H. F. Sadgebury
J. B. Ricketts

Inventor
William H. Muzzy
by R. C. ...
Carl Beust
Attorneys

W. H. MUZZY.
CASH REGISTER.
APPLICATION FILED OCT. 29, 1914.
1,153,330.
Patented Sept. 14, 1915.
2 SHEETS—SHEET 2.
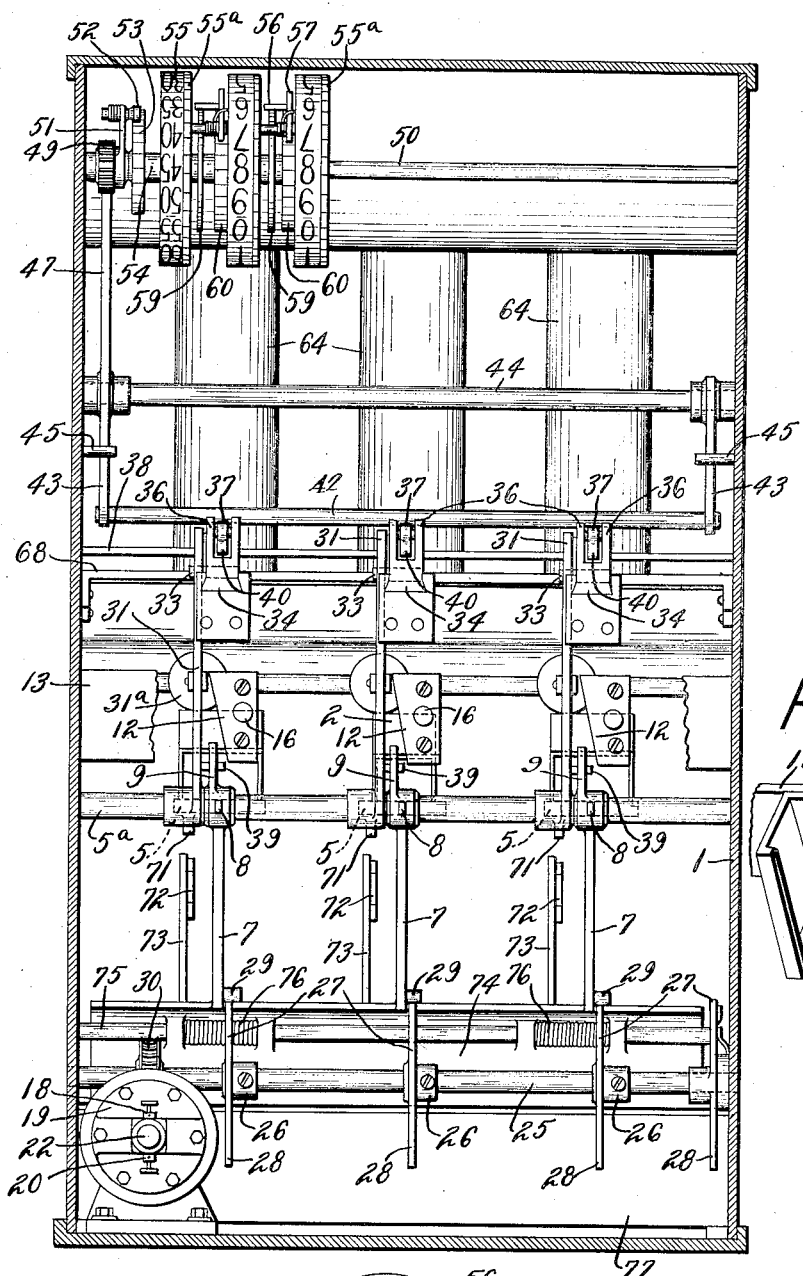
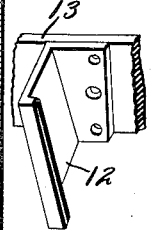
Witnesses
H. F. Sadgebury
J. B. Ricketts
Inventor
William H. Muzzy
by R. C. Mass.
Carl Benst
Attorneys

UNITED STATES PATENT OFFICE.

WILLIAM H. MUZZY, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,153,330.  Specification of Letters Patent.  Patented Sept. 14, 1915.

Original application filed October 7, 1907, Serial No. 396,331. Divided and this application filed October 29, 1914. Serial No. 869,309.

*To all whom it may concern:*

Be it known that I, WILLIAM H. MUZZY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in registers adapted to issue receipts.

The object of the invention is to provide a registering mechanism in combination with receipt issuing devices; the whole to be controlled by the insertion of coins, whereby suitable value receipts will be automatically issued and the value thereof registered by the operation of the machine.

The cash register is mainly intended to make a record of one kind or another of each transaction in a store. A well known type is provided with keys which control the operation of adding and printing mechanisms, so that amounts and other characteristics of transactions may be recorded in the machine. The machines are arranged to issue automatically printed receipts giving the amount of the purchase, thus protecting the customer as does any receipt. In many cases, the clerks making sales operate these machines and give the printed receipts which the machines issue to the customer. Thus the proprietor is certain of getting all the money he should, as the customer naturally will not accept a receipt for a smaller amount than that of the sale and if the register issues a receipt, the amount thereof is recorded in the machine.

In some cases it is desired not to have the clerk handle the money and there a cashier system may be employed. In such a system, the clerk operates the cash register to issue the receipt and hands it to the customer, who thereupon takes it to the cashier and pays the amount it calls for. At the end of the day, of course, the cashier should have as much money as is indicated by the adding device of the cash register operated by the clerk. In a variation of this cashier system, used for example, at soda fountains and places of that class, the register is at the cashier's desk. A customer desiring to be served with soda water or the like, goes first to the cashier and states the amount he or she wishes to expend. The cashier takes the money and operates the register, thus issuing a printed receipt showing the amount of the purchase. The customer takes this receipt and uses it to pay at the soda fountain for the soda consumed. Here also, the clerk handles no money and the difference is that the receipt is issued before the goods are furnished and not afterward as was the case in the system previously described.

The machine of this invention is adapted especially to be employed with this last described system. That is, it is intended that the cashier shall operate the machine and hand the receipt issued by it to the customer, the customer then using the receipt in payment of goods furnished him. In the present case, the receipts instead of being printed by the machine are in the form of previously marked tokens which are stored in the cash register and are automatically issued by it. Moreover, the operation of the machine is not determined by pressing keys but by dropping the coins themselves into the machine. When a coin is dropped into the particular slot corresponding to it, it sets the mechanism in motion and the machine proceeds to add the amount of the sale on a common adding device and also automatically issues the proper receipt. The customer then takes this receipt and uses it in the purchase of goods. The clerk handles no money whatever.

In the particular embodiment shown, the machine is adapted to handle 5¢ pieces, 10¢ pieces and 25¢ pieces. It is therefore provided with three coin slots and the mechanism is so constructed that a coin inserted in any one of the slots will start an electric motor which adds an amount equal to the coin value on an adding device common to all three mechanisms, and serves to issue from one of three receptacles the desired and proper receipt.

Such cash registers as this, wherein the operation is determined by inserted coins have been heretofore proposed, and their use is not limited to the precise system just described. The present machine, for example, might be readily used by the clerks themselves. In such a system, the clerks would receive the money tendered for purchase and insert it in the proper slot or slots in the machine. Thereupon the operation of the machine would occur and the amount of the money entered would be added on the totalizing device. The money remains in the machine out of reach of the clerk. In such a system no device for delivering receipts would be essential, though there would still be an advantage in being able to give the customer a receipt for his purchase.

The machine may also be used to be operated directly by the customer. In such a use the customer would insert money in the proper slot and after the machine is operated would take the receipts issued by it and use them in payment of goods. Such a system would do away with the necessity for the cashier previously referred to.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings,—Figure 1 represents a central transverse section through the machine. Fig. 2 represents a detail perspective view of one of the coin trays. Fig. 3 represents a rear elevation of the machine with the back of the casing removed. Fig. 4 represents a detail perspective of one of the contact plates; and Fig. 5 represents a detail transverse section through the registering mechanism.

Described in general terms the machine comprises a plurality of counter balanced levers, each being adapted to be operated by a coin of certain denominational value. Each coin deposited rocks its lever far enough to form a circuit through an electric motor which will continue the movement of the lever to actuate the coin displayer and registering mechanism and issue a receipt or receipts of the value of the coin inserted.

The particular form of receipt shown in this application is a circular token or check. For this reason the detailed description hereinafter given describes the receipts as "checks" and the devices for issuing them as "check ejecting devices," for the sake of clearness. But it will be evident that the invention, broadly considered, does not depend on the use of any particular form of receipt, but is found in any form of token, check or other device which may be issued by the machine, printed or otherwise bearing an inscription indicative of its value.

*Operating mechanism.*—The casing 1 in the present instance is provided with three coin chutes 2 adapted to receive five, ten and twenty-five cent pieces respectively. Upon depositing a coin of any of the above named denominations in its respective chute 2, it will slide through and rest upon a coin tray 5 secured to the end of a lever 6 and thus rock said lever. The downward, rearward and upward arms of the levers 6 are numbered 7, 8 and 9 respectively. It is to be understood that there is one of these counter balanced levers, which are pivoted upon a transverse shaft $5^a$, for each chute 2, and that each lever is provided with a suitable counter-balance $8^a$. After a coin has been inserted a lever will be rocked to the position shown by the dotted lines in Fig. 1 with the rear arm 8 in contact with one side of the metallic plates 12 secured to and projecting forward from an insulated plate 13 attached to the casing of the machine. As soon as the arm 8 touches the plate 12 a circuit is made from a battery 14 through wire 15 to the binding post 16, plate 12, arm 8, shaft $5^a$, wire 17 to the binding post 18 through the motor 19, and thence from a binding post 20 through wire 21 back to the battery 14. The shaft 22 of the motor is equipped with a worm 23 which revolves a worm gear 24 secured to one end of a transverse shaft 25. Adjacent to the downwardly extending arm 7 of each counter balanced lever is a two arm lever 25 whose arms 27 and 28 are diametrically opposite each other. The levers 26 are secured to the shaft 25, so that the arms 27 (Fig. 1) engage pins 29 extending laterally from the arms 7 of the counter balanced levers when the latter are moved to the position shown by dotted lines in said figure by the weight of a coin. The arm 8, which is flexible, moves up the inclined side of its plate 12 to continue the contact. By the time arm 27 has passed out of engagement with its pin 29, the arm 8 will have passed above the plate 12 thereby breaking the circuit but the momentum of the motor will be sufficient to rotate the shaft 25 through the worm 23 and the worm gear 24 until the said shaft is stopped by the right hand arm 28, (Fig. 3), engaging with a friction spring 30 attached to the side of the casing 1. As the shaft 25 is given only a half revolution upon each operation of the machine, it will be seen that the arms 27 and 28 of the levers 26 will alternately contact with the pins 29 projecting from the arms 7 of the counter balanced levers when the latter have been brought into the path of said arms by the weight of inserted coins. The displaced lever is returned to normal position by a spring 35 controlled by a suitable dash pot $31^a$ as hereinafter described. Each plate 12 is inclined at such an angle that, as the arm 8 ascends it will ride upon one side of said plate and as it descends it will ride down the opposite side which is insulated, thereby preventing the motor 19 from being energized as the frame is returned. The arm 8 returns to its normal position when it passes free of the lower end of the plate 12.

*Registering mechanism.*—While the registering mechanism shown in the drawings is old and well known in the art, it is to be understood that the invention is not to be limited to this particular type of mechanism, as any of the other well known types may be employed. Referring to Figs. 1 and 3, it will be seen that adjacent to each counter balanced lever and mounted upon the same shaft is an upward extending arm 31 provided at its upper end with an elongated slot 32 into which enters a pin 33 projecting from a slide 34, each arm and slide being held in a retracted position by a spring 35. Extending upward from each slide 34 are two projections 36 between which is mounted the rear end of link 37, the forward end resting upon a transverse rod 38. Projecting laterally from each vertical arm 31 is a pin 39 which is arranged to be engaged by the upright arm 9 of the counter balanced lever as the latter is rocked by the previously described motor mechanism so that the arm 31 will also be rocked carrying with it its slide 34 and link 37. The initial movement of the lever by a coin does not operate the arm 31 but only brings the arm 9 and pin 39 together. Each link 37 is provided with a shoulder 40 and a recess 41, the former engaging a rod 38 as the link is carried forward by its slide, thereby raising the forward end of the link so that a rod 42 mounted in the lower ends of vertical arms 43 will enter the recess and carry said rod and arms the rest of the movement of said link. While the links 37, when operated, are given a definite movement, the recesses 41 being different distances from the rod 42 will give the latter a differential movement. The arms 43 are loosely mounted upon a transverse shaft 44 and are held in contact with pins 45 projecting from the casing 1 by springs 46. The left hand arm 43 (see Fig. 3) is provided with a rack segment 47 having teeth 48 at its upper edge that mesh with a pinion 49 loosely mounted upon a shaft 50. Secured to this pinion is an arm 51 which carries at its outer end a pawl 52 which is spring-pressed into engagement with a ratchet wheel 53 attached to one end of a short sleeve 54, to the other end of which is secured a cents registering wheel 55 with numerals from 0 to 95 in multiples of five. The pawl 52 drives the ratchet wheel in one direction, but rides idly over the same in the opposite direction. As the cents registering wheel moves from 95 to 0, a pin 56 projecting from a spring pressed pawl 57 secured to the cents wheel will enter a cut out portion 58 of a stationary disk 59 thereby allowing said pawl to engage with a tooth of a ratchet wheel 60 secured to the units of dollars wheel to advance it one space, after which the pawl 57 will be cammed out of engagement with the ratchet wheel, all of which is well known in the art and needs no further description here. Attached to one side of each of the registering wheels is a star wheel 55$^a$ with which a spring pressed pawl 56$^a$ engages to prevent any accidental displacement or over rotation of same. The top of the casing 1 is hinged as at 61 and is provided with a glass covered opening 62 through which the amounts on the adding wheels may be seen. This top is provided with a hinged lid 63 which is normally locked in position to cover the opening 62 so that only an authorized person may read the amounts on the adding wheels. The counter may be turned to zero in any well known manner.

*Check ejecting devices.*—A plurality of tubes or receptacles 64, corresponding to the number of coin chutes 2, are mounted in the upward forward part of the casing, and each contains a number of checks 65 which are arranged to be ejected into a receptacle 66 secured to the front of the casing by the following described mechanism. Each slide 34 of the registering mechanism is provided with a narrow forward projection 67 which is supported by a guide 68 suitably secured to the casing. The projection 67 of the five cent slide normally rests in a recess, formed on the back of the tube 64 and when moved forward, ejects a single check from the first tube, while the ten and twenty-five cent slides are provided with enlarged heads 68$^a$ which, when said slides are operated, eject two and six checks respectively, an extra check being given as an inducement for the customer to spend twenty-five cents. A shield 69 is attached to the front of the casing to prevent the withdrawal of checks without an operation of the machine.

*Coin displayer.*—Without some device to display the amount deposited, unscrupulous persons could manipulate the machine by inserting slugs therein, and in order to overcome this method of manipulation, the following described mechanism has been devised. Pivoted to the under side of each coin tray 5 is an arm 70 which is held in contact with the tray by a leaf spring 71. Upon depositing a coin in one of the chutes 2, the counter balanced lever corresponding thereto will be rocked into the dotted line position shown in Fig. 1, where it will be temporarily arrested by the upright arm 9 of said lever contacting with the pin 39 of the vertical arm 31. As the shaft 25 starts to revolve, one of the arms 27 will contact with the pin 29 projecting from the downward extending arm 7 of the lever and rock the latter. During the first part of this movement, the arm 70 will engage with a bevel lug 72 attached to the upper end of an arm 73 extending upward from a plate 74, which is pivotally mounted upon a transverse shaft 75, and thus rock the arm 73 forward and the plate 74 downward against the tension of coil springs 76, (see Fig. 3) surrounding the shaft 75. This rocking of the plate 74 will deposit the displayed coin into a locked receptacle 77 mounted in the lower part of the casing. As the coin tray carried by the arm 6 continues its downward movement, the arm 70 will pass the lug 72 and the plate 74 will then spring back into the position shown in Fig. 1, after which the coin on the tray will slide on to the plate 74 beneath the glass covered opening 78 in the casing. Partitions 79 extend from the casing to the plate 74 and thereby form compartments for the different coins. As the lever is returned toward its normal position through means of the spring 35 drawing the arm 31 back to normal position, the arm 70 will wipe by the lug 72 without moving the plate 74. The arm 6 of said frame contacts with a rod 80 and limits the return movement of the frame.

In a great many establishments, during the different seasons of the year, extra help is employed to take care of certain lines of business, such as soda fountains in drug stores, and as these positions are only temporary, the proprietor finds it difficult to hire honest, capable and efficient employees. With a type of machine as herein described, this difficulty is removed to a great extent, if not wholly. as the employee does not handle the money and has only to attend to the delivering of the goods.

By holding the clerk responsible for any shortage that may occur between the amount shown on the adding wheels and the amount in the cash receptacle, he will be constantly on the alert to detect any attempt at manipulation of the machine.

While I have shown in the present drawings an electric motor for automatically operating the machine, it will be readily understood that any suitable form of motor, such for instance as a spring motor, may be employed without departing from the spirit of this invention.

It will also be understood that instead of a registering mechanism, I might with equal facility employ another form of accounting device, such for instance as a printing mechanism.

By providing suitable partitions in drawer 77, the coins of different denominations may be kept separate and the proprietor thus enabled to determine whether any coins have been improperly inserted in the wrong slots in the machine.

All the patentable subject-matter disclosed in this application is not claimed herein as this is a division application of the original application for Letters Patent of the United States filed October 7, 1907, Serial No. 396,331.

What is claimed is:—

1. In a machine of the class described, the combination with a registering device, and an actuating frame therefor, of a plurality of levers connected to actuate said frame to differential extents, a plurality of levers constructed to be actuated by deposited coins and positioned to engage and operate said frame actuating levers, a motor, and a connection therefrom constructed to drive said coin actuated levers after their coin actuated movement.

2. In a machine of the class described, the combination with a registering mechanism, of a motor, a source of electrical energy, a counter-balanced lever moved by the weight of a coin to close a circuit through the motor, and means to continue the movement of the lever from the motor to actuate the registering mechanism.

3. In a machine of the class described, the combination with registering mechanism for registering the total value of coins of different denominations inserted into the machine, of actuating mechanism therefor controlled by the inserted coins, a normally inoperative operating mechanism for the actuating mechanism, and means operated by the weight of the coins for controlling the extent of actuation of the actuating mechanism by the operating mechanism and for rendering the operating mechanism operative.

4. In a machine of the class described, the combination with registering mechanism for registering the total value of coins of different denominations inserted into the machine, of actuating mechanism therefor, a plurality of devices for actuating said actuating mechanism and selectively controlled by the inserted coins, a normally inoperative operating mechanism for said devices, and means controlled by the coins for selecting the device to be operated by the operating mechanism and for rendering said operating mechanism operative.

5. In a machine of the class described, the combination with registering mechanism, for registering the total value of coins of different denominations inserted into the machine, of actuating means therefor, a plurality of devices for selectively actuating said actuating means, a normally inoperative operating mechanism for said devices, and means operated by the weight of the coins for selecting the device to be operated by the operating mechanism and for rendering said operating mechanism operative.

6. In a machine of the class described, the combination with registering mechanism for registering the total value of coins of different denominations inserted into the machine, of actuating means therefor controlled by the inserted coins, a motor for operating said actuating means, a source of electric energy, and means operated by the weight of the inserted coins to close the circuit through the motor.

7. In a machine of the class described, the combination with registering mechanism, for registering the total value of coins of different denominations inserted into the machine, of actuating means therefor controlled by the inserted coins, a motor for operating said actuating means, a source of electric energy, and means controlled by the inserted coins to close the circuit through the motor.

8. In a machine of the class described, the combination with registering mechanism, for registering the total value of coins of different denominations inserted into the machine, of actuating means therefor, a plurality of devices, one for each denomination of coins, for selectively actuating said actuating means, a motor for operating said devices, a source of electric energy, and means controlled by the inserted coins for selecting the device to operate the actuating means and for closing the circuit through the motor.

9. In a machine of the class described, the combination with registering mechanism for registering the total value of coins of different denominations inserted into the machine, of actuating means therefor, a plurality of devices, one for each denomination of coins, for selectively actuating said actuating means, a motor for operating said devices, a source of electric energy, and means movement of which is effected by the inserted coins for selecting the device to operate the actuating means and for closing the circuit through the motor.

10. In a machine of the class described, the combination with registering mechanism for registering the total value of coins of different denominations inserted into the machine, of actuating means controlled by the inserted coins, a plurality of devices selected for operation by the coins and adapted to operate said actuating means, a normally inoperative operating mechanism for said devices, a plurality of coin displayers, one for each denomination of coins, devices, one for each denomination of coins controlled by the coins for selecting the actuating device to be operated by the operating mechanism, for rendering the operating mechanism operative, and for selectively controlling the operation of their corresponding coin displayers.

11. In a machine of the class described, the combination with registering mechanism for registering the total value of coins of different denominations inserted into the machine, of actuating means controlled by the inserted coins, a plurality of devices selected for operation by the coins and adapted to operate said actuating means, a normally inoperative operating mechanism for said devices, a plurality of coin displayers one for each denomination of coins, and devices, one for each denomination of coins, operated by the coins for selecting the actuating device to be operated by the operating mechanism, for rendering the operating mechanism operative, and for selectively controlling the operation of their corresponding coin displayers.

12. In a machine of the class described, the combination with a registering device, of an actuating frame therefor, a plurality of levers constructed to actuate said frame to differential extents, a plurality of levers constructed to be controlled by deposited coins and positioned to engage and operate said frame actuating levers, a motor, and connections therefrom constructed to drive said coin controlled levers after their coin controlled movement.

13. In a machine of the class described, the combination with a registering mechanism, of a motor, a source of electrical energy, a counter-balanced lever movement of which is effected by a coin to close a circuit through the motor, and means to continue the movement of the lever from the motor to actuate the registering mechanism.

In testimony whereof I affix my signature in the presence of two witnesses.

WILLIAM H. MUZZY.

Witnesses:
J. B. RICKETTS,
EZRA M. KUHNS.